United States Patent
Bühler et al.

[11] Patent Number: 5,917,121
[45] Date of Patent: Jun. 29, 1999

[54] MONOAZO DYES WHICH ARE STABLE UNDER DYEING CONDITIONS, THEIR PREPARATION AND THEIR USE

[75] Inventors: Ulrich Bühler, Alzenau; Hubert Kruse, Königstein; Heinz G. Zorn, Köln; Klaus-Wilfried Wanken, Leverkusen, all of Germany

[73] Assignees: Dystar Textilfarben GmbH & Co. Deutschland KG, Germany; Dystar Japan Ltd., Japan

[21] Appl. No.: 08/913,074

[22] PCT Filed: Mar. 7, 1996

[86] PCT No.: PCT/EP96/00970

§ 371 Date: Sep. 5, 1997

§ 102(e) Date: Sep. 5, 1997

[87] PCT Pub. No.: WO96/29368

PCT Pub. Date: Sep. 26, 1996

[30] Foreign Application Priority Data

Mar. 20, 1995 [DE] Germany ............ 195 10 097
Dec. 20, 1995 [DE] Germany ............ 195 47 637

[51] Int. Cl.[6] ............ C09B 67/48; C09B 67/10; C09B 67/38; C09B 41/00
[52] U.S. Cl. ............ 8/526; 8/662; 534/575
[58] Field of Search ............ 8/526, 662; 534/575

[56] References Cited

U.S. PATENT DOCUMENTS 4,319,880  3/1982  Opitz et al. ............ 8/526
4,327,999  5/1982  Koller et al. ............ 8/526
4,795,807  1/1989  Bühler ............ 534/58
5,069,682  12/1991 Binder et al. ............ 8/526

FOREIGN PATENT DOCUMENTS 138 534    1/1967  Czechoslovakia .
240 902    3/1987  European Pat. Off. .
1544 451   5/1969  Germany .
60-169962  1/1994  Japan .

OTHER PUBLICATIONS

Neumüller, Römpps Chemie–Lexikon (1983) pp. 1714–1715.

*Primary Examiner*—Margaret Einsmann
*Attorney, Agent, or Firm*—Connolly & Hutz

[57] ABSTRACT

The present invention relates to the β and γ modifications of the dye of the formula (I)

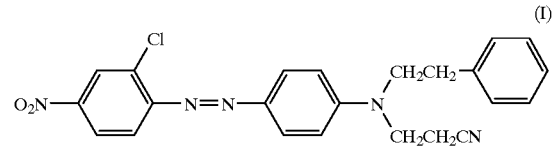

as well as to a process for their preparation and their use for dyeing and printing textile materials of polyester and/or cellulose esters or blended fabrics of these materials and wool or cellulose.

18 Claims, 3 Drawing Sheets

MONOAZO DYES WHICH ARE STABLE UNDER DYEING CONDITIONS, THEIR PREPARATION AND THEIR USE

The present invention relates to new crystal modifications of the dye of the formula (I)

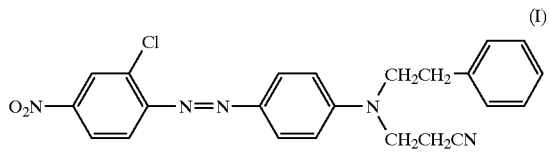

which are stable during dyeing and to a process for their preparation.

Figure 2:
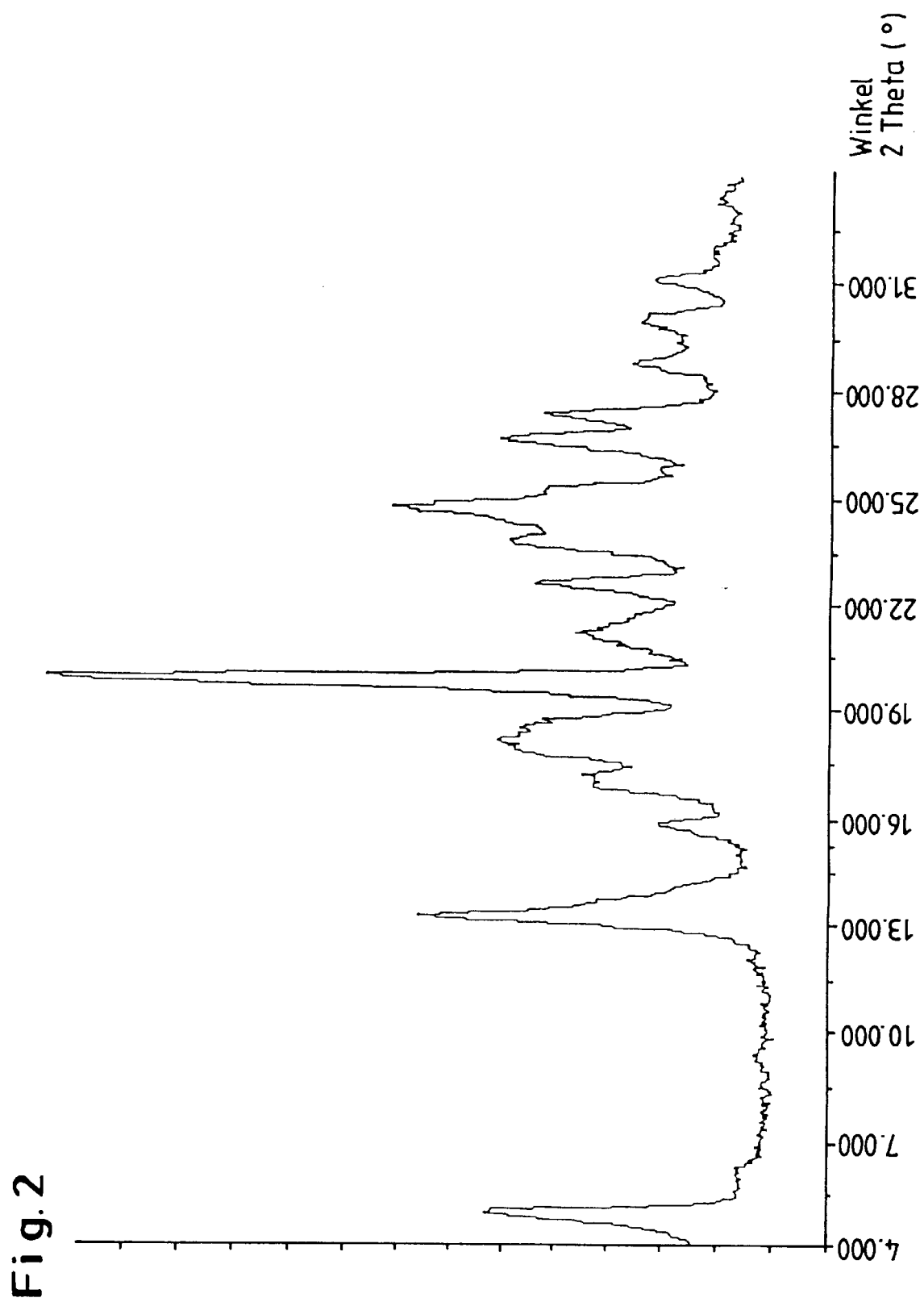

The dye of the formula (I) is known per se. It can be obtained in the manner described in DE-A -15 44 451 by diazotising 2-chloro-4-nitroaniline and coupling the resulting diazonium salt onto N-(2-cyanoethyl)-N-(2-phenylethyl)aniline in an aqueous mineral acid medium. In this reaction it is however obtained in an unstable crystal modification (the "α-modification"), whose X-ray diffraction diagram (Cu $K_\alpha$ radiation) is shown in FIG. 2 and which is characters by lines at the following diffraction angles 2 θ (°):

high-intensity lines:

4.8; 13.2; 18.1; 19.8; 23.9; 24.7; 26.7;

medium-intensity lines:

15.8; 17.1; 21.2; 22.6; 27.3; 28.8; 30.0; 31.1.

The dye of the formula (I) is also obtained in this modification, which is unstable during dyeing, if the coupling is carried out in the presence of a specific carboxylic acid ester, such as for example butyl acetate, according to the The use of such aliphatic carboxylic acid esters, in particular butyl acetate, also has the disadvantage that the coatings and in particular the rubber linings of the reaction vessels, undergo attack and these vessels are thus permanently damaged. The required dye is contaminated as a result.

Powder and liquid preparations produced from the dye in its unstable crystal modification display considerable technical deficiencies, particularly during the handling thereof, and also even during their production as well as during the dyeing of textile polyester materials. Technical deficiencies during the handling of such preparations occur for example when they are redispersed, i.e. when they are incorporated in dyeing liquors and printing pastes. Problems such as sedimentation, agglomeration, phase separation and the formation of putty-like deposits do however occur particularly when these preparations are used in a redispersed form in modern dyehouses.

The object of the present invention was to provide dye modifications which are stable during dyeing as well as an economical process for their preparation.

New crystal modifications (the "γ modification and the β modification") of the dye of the formula (I)

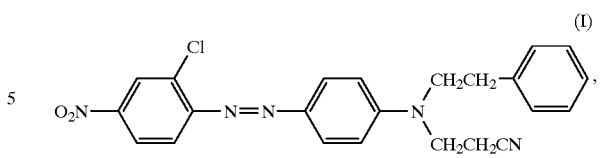

which are stable during dyeing, have been found, which have lines in the X-ray diffraction diagram (Cu $K_\alpha$ radiation) at the following diffraction angles 2 θ (°):

γ-modification high-intensity lines:

11.57; 14.90; 17.14; 20.64; 24.35; 25.05; 26.37;

medium-intensity lines:

10.26; 13.71; 16.81; 18.71; 20.94; 22.07; 23.84; 28.81; 29.69.

β-modification high-intensity lines:

4.9; 13.95; 17.15; 19.5; 21.85; 25.2; 26.05; 28.75;

medium-intensity lines:

16.0; 24.3; 27.3; 30.0; 31.15.

Figure 1:
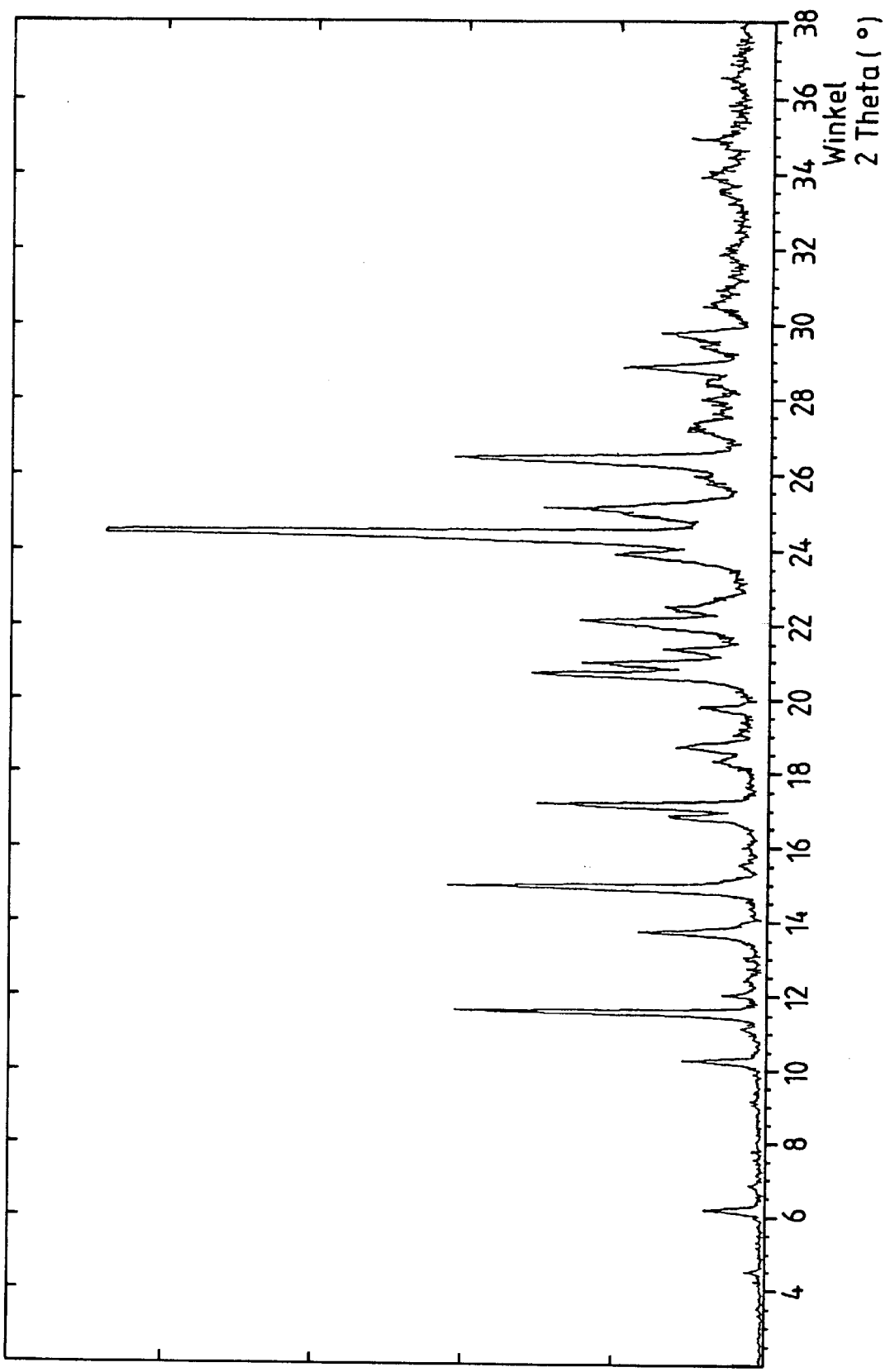
Figure 3:
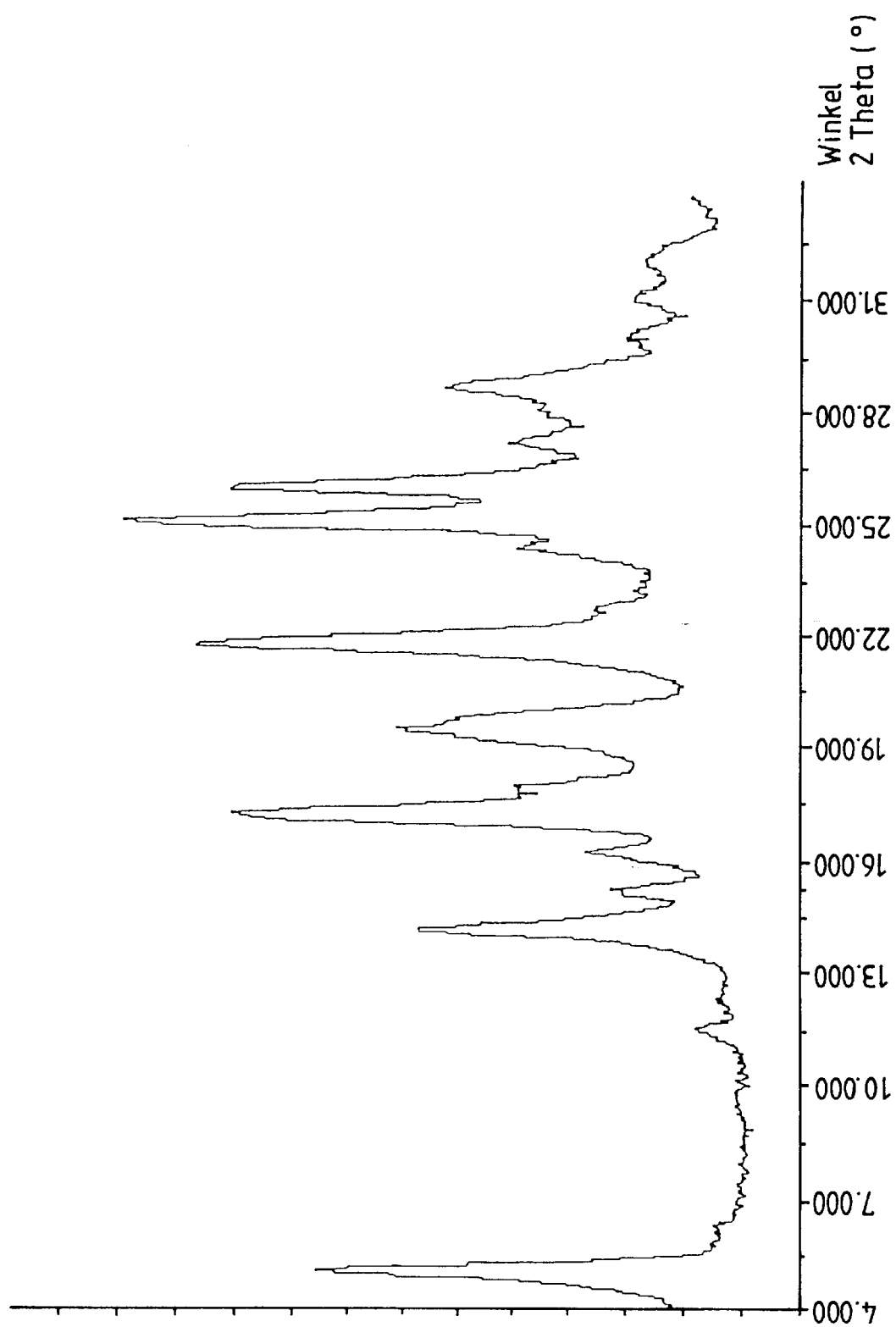

The X-ray diffraction diagram, which was recorded with Cu $K_\alpha$ radiation, of the γ modification, which is stable during dyeing, is shown in FIG. 1 and that of the β modification in FIG. 3. These diagrams were recorded using a computer-controlled Siemens D 500 powder diffractometer.

The dye can be used without problems if it is present in the β or γ modification according to the invention. These β and γ modifications allow higher space-time yields to be obtained in the production of powder or granular preparations, and dyeings are produced on piece goods and wound packages which are speck-free and free of dye deposits, i.e. are homogeneous.

The β modification according to the invention can be obtained by heating the dye which is present in the αmodification in an aqueous phase to temperatures of preferably 70 to 150° C., and particular 90 to 130° C. This heating process is usually carried out in an aqueous suspension and appropriately with stirring. If the temperatures used are higher than the boiling point of the aqueous phase, the conversion into the β modification is carried out in closed vessels, such as for example autoclaves. Heating is carried out until the a modification is completely converted into the β modification.

The complete conversion of the a modification into the β modification usually takes 0.5 to 5 hours, it being possible to monitor the reaction by conducting X-ray or microscopic examinations of samples extracted during the heat treatment.

During the conversion of the α modification into the β modification it is possible to add one or more surface-active substances to the aqueous phase. These surface-active substances can have a wetting, viscosity-reducing, dispersing or dissolving effect and they can be of an anionic, cationic or non-ionic kind.

Suitable surface-active substances are for example alkali metal salts such as lignosulphonates, alkali metal salts of the condensation products of naphthalenesulphonic acids and formaldehyde,. polyvinyl sulphonates, ethoxylated novolaks, ethoxylated fatty alcohols, fatty acid polyglycol esters and tertiary phosphoric acid esters. The surface-active substances can be used individually or in combination with one another. The quantity of surface-active substance, based on the quantity of dye of the formula (I) in the α modification is usually 0.01 to 400% by weight and depends on the type of further processing involved.

After the dye has been converted into the β modification it can for example be isolated from the aqueous suspension by filtration. In order to avoid pollution of the effluent and to avoid losses in yields, only 0.01 to 10 % by weight, and preferably 0.1 to 1% by weight, of the surface-active substances are normally used.

It is however also possible to finish the dye, i.e. to convert it into powder or liquid preparations commonly used commercially, directly after the heat treatment, without any intermediate isolation. For this purpose the heat-treated suspension is converted into a dispersion by milling. It is preferable to carry out the heat treatment in the presence of those dispersing agents and optionally also auxiliaries which are required to be contained in the finished powder or liquid preparation, or in the presence of a certain proportion of these agents. These dispersing agents are identical to the abovementioned surface-active substances. If less than the total quantity of the aforementioned dispersing agents and auxiliaries was added during the heat treatment the remaining quantity is added before milling. In this case 10 to 400% by weight, and preferably 20 to 200% by weight, of surface-active substances, based on the dye in the α modification, are added during the heat treatment.

The conversion of the α modification into the β modification by heat treatment in an aqueous phase can also be carried out with the addition of one or more organic solvents. These organic solvents are either miscible with water in any ratio or are immiscible or only slightly miscible with water.

Solvents which are miscible with water are for example ethanol, i-propanol and dimethyl sulphoxide (DMSO). Solvents which are immiscible or only slightly miscible with water are for example n-butanol, butyl acetate and toluene.

The temperatures for the heat treatment in an aqueous phase with the addition of organic solvents are preferably between 70 and 150° C. Depending on the temperature of the heat treatment or of the boiling point of the organic solvent added it may be necessary to carry out the heat treatment under pressure, e.g. in an autoclave. The duration of the heat treatment depends, inter alia, on the dissolving power of the liquid phase, i.e., inter alia, also on the dissolving power of the organic solvent added and the quantitative proportion thereof.

The quantity of organic solvents, based on the aqueous phase, can vary within wide limits. It can-be between 5 and 95% by weight, and preferably between 10 and 50% by weight, in the case of water-miscible solvents. In the case of solvents which are immiscible or only slightly miscible with water it is generally between 1 and 25% by weight, preferably 2 to 10% by weight.

Following the conversion into the β modification the organic solvent is usually removed from the dye suspension by distillation or steam distillation and the dye is isolated from the aqueous phase by filtration. The dye can however also be isolated directly from the solvent mixture by filtration.

When heating the dye in an aqueous phase, whether this be a purely aqueous phase or a phase containing an organic solvent, it is advantageous to adjust the pH value of the aqueous phase to 6 to 8 and to keep the pH value at this level, since otherwise losses in colour intensity and deviations in the colour shade can occur.

The dye of the formula (I) present in the a modification can also be converted into the β modification by recrystallisation. Suitable solvents are organic solvents, mixtures of organic solvents or mixtures of water-miscible organic solvents with water. Suitable organic solvents are for example ethanol, butyl acetate or toluene.

It is recommendable for the α modification to be converted to be dissolved in the selected solvent by heating, whereupon the β modification crystallises out on cooling. Alternatively the β modification can be precipitated from the solution by adding a solvent which has poorer dissolving power, such as for example water.

The resulting dye in the β modification can be isolated from the solvent by filtration. It is however also possible to expel the solvent, for example after the addition of water, by distillation or steam distillation and then to isolate the dye by filtration from the aqueous phase.

It is also possible to carry out the conversion of the α modification into the β modification directly after the coupling reaction by heat treatment of the coupling suspension. This can take place in the same reaction vessel as the coupling reaction. In order to prevent the hydrolysis of the dye, the mineral acid, preferably $H_2SO_4$, used for the diazotisation and the coupling reaction, is preferably completely or substantially neutralised in the coupling suspension beforehand.

Finally, the β and γ modifications can also be obtained directly during the coupling reaction, i.e. without any form of heat treatment, if the coupling of the diazotised 2-chloro-4-nitro-aniline onto N-(2-cyanoethyl)-N-(2-phenylethyl) aniline is carried out in the presence of suitable auxiliaries.

In the production of azo dyes it is known to carry out the coupling reaction in the presence of auxiliaries which enhance the filterability of the dye obtained during the coupling reaction and which improve the paste content of the filter cake obtained after filtration, without any need for heat treatment. Thus, in a process described in Czechoslovakian Patent No. 138,534 for the preparation of specific azo dyes, an adduct of ethylene oxide with a $C_8$–$C_{16}$ alcohol or a sulphated ethylene oxide adduct with such an alcohol is added during the coupling reaction in order to improve filterability. There is however no indication that this additive has any influence on the crystal modification.

According to the process of EP-A 240,902, which has already been mentioned above, the filterability is improved by carrying out the coupling reaction in the presence of an ester of an optionally substituted lower aliphatic carboxylic acid and an optionally substituted aliphatic alcohol, it being possible for surface-active substances, such as for example lignosulphonates, also to be present in addition to the ester during the coupling reaction. The disadvantages of this process are however, particularly with regard to the dye of the formula (I), that it is obtained in the α modification, which is unstable during dyeing, and more generally, that the ester acts on the rubber-coated interior walls of the vessel in such a manner that the rubber coating swells and is finally destroyed, in addition to which complicated modifications of the apparatus are required due to the explosiveness of the ester/air mixtures and the unacceptable odour produced by the highly volatile ester.

Surprisingly a process has now been found in which the dye of the formula (I) is obtained in a readily filterable form in the β modification or the γ modification, both of which modifications are stable during dyeing, when diazotized 2-chloro-4-nitroaniline is coupled onto N-(2-cyanoethyl)-N-(2-phenylethyl)aniline, which process is characterised in that the coupling reaction is carried out in the presence of one or more auxiliaries from the series comprising the tertiary phosphoric acid esters of fatty alcohols and/or fatty alcohol polyethylene glycol ethers; the tertiary phosphoric acid esters of fatty alcohol polyethylene glycol ethers and/or polyethylene glycols; the fatty alcohol polyethylene glycol ethers; the fatty acid polyethylene glycol esters; the tributylphenyl polyethylene glycol ethers; and the nonylphenyl polyethylene glycol ethers and in the absence of an ester of an optionally substituted lower aliphatic carboxylic acid and an optionally substituted aliphatic alcohol.

The coupling auxiliaries which can be used according to the invention are surface-active substances. They are known and can be produced by known methods. The industrially prepared products are in many cases mixtures of substances and can be used in this commercially common form.

In the context of the present invention the fatty alcohols from which some of the abovementioned coupling auxiliaries are derived are understood to be preferably $C_{10}$ to $C_{18}$ alcohols, and more preferably $C_{14}$ to $C_{18}$ alcohols, which are based on saturated or unsaturated, straight-chain or branched, aliphatic hydrocarbons, it being possible for a coupling auxiliary to be based not only on an individual fatty alcohol having a specific number of carbon atoms, but also on a mixture of alcohols having for example different numbers of carbon atoms and/or different degrees of saturation in any desired quantitative ratios. Suitable bases for the auxiliaries according to the invention are for example lauryl alcohol, myristyl alcohol, palmityl alcohol, stearyl alcohol, unsaturated oleyl alcohol, saturatued coconut fatty alcohols having 10 to 18 carbon atoms, saturated tallow fatty alcohols having 16 to 18 carbon atoms or a mixture containing oleyl alcohol and having 16 to 18 carbon atoms. In the text below the saturated or unsaturated ($C_{10}$–$C_{18}$) hydrocarbon radical of fatty alcohols is designated $R^0$ and fatty alcohols thus have the formula $R^0OH$.

The polyethylene glycol units contained in the abovementioned coupling auxiliaries are based on the polyethylene glycols of the formula $H(OCH_2CH_2)_nOH$ from which the coupling auxiliaries are formally obtained by etherification and/or esterification at one or both of the hydroxyl groups. In the industrial preparation of the coupling auxiliaries the polyethylene glycol unit is introduced particularly by for example reacting a fatty alcohol with ethylene oxide, it being possible for the number of mols of ethylene oxide per mol of substance to be ethoxylated to be varied within wide limits. Industrial ethoxylation generally produces mixtures of substances having different degrees of ethoxylation, and the average number of mols of ethylene oxide per mol of substance to be ethoxylated, which characterises an industrial product, is in many cases a fraction rather than an integer.

Tertiary phosphoric acid esters of fatty alcohols and/or fatty alcohol polyethylene glycol ethers are compounds of the formula $O=P(OR^1)(OR^2)(OR^3)$ in which the radicals $R^1$, $R^2$ and $R^3$ can be identical or different. The alcohols $R^1OH$, $R^2OH$ and $R^3OH$ on which they are based can, independently of one another, be fatty alcohols of the formula $R^0OH$ or fatty alcohol polyethylene glycol ethers of the formula $R^0(OCH_2CH_2)_pOH$, in which p is preferably a number from 1 to 10, and more preferably a number from 1 to 4.

Tertiary phosphoric acid esters of fatty alcohol polyethylene glycol ethers and/or polyethylene glycols are compounds of the formula $O=P(OR^4)(OR^5)(OR^6)$, in which the radicals $R^4$, $R^5$ and $R^6$ can be identical or different. The alcohols $R^4OH$, $R^5OH$ and $R^6OH$ on which they are based can, independently of one another, be fatty alcohol polyethylene glycol ethers of the formula $R^0(OCH_2CH_2)_qOH$ or polyethylene glycols of the formula $H(OCH_2CH_2)_rOH$, in which q is preferably a number from 1 to 10, more preferably a number from 1 to 4, and r is preferably a number from 2 to 15, and more preferably a number from 5 to 10.

Fatty alcohol polyethylene glycol ethers are compounds of the formula $R^0(OCH_2CH_2)_sOH$, in which s is preferably a number from 5 to 50 and more preferably a number from 10 to 30.

Fatty acid polyethylene glycol esters are compounds of the formula $R^7CO(OCH_2CH_2)_tOH$, in which t is preferably a number from 5 to 50 and more preferably number from 10 to 30. $R^7$ is the saturated or unsaturated hydrocarbon radical of a fatty acid. In the context of the present invention, preferred fatty acids of the formula $R^7COOH$ are saturated or unsaturated $C_{10}$ to $C_{20}$ fatty acids, more preferably $C_{16}$ to $C19$ fatty acids. Examples of suitable fatty acids are myristic acid, palmitic acid, stearic acid or oleic acid and mixtures thereof in any desired quantitative ratios.

Tributylphenyl polyethylene glycol ethers and nonylphenyl polyethylene glycol ethers are compounds of the formula $Ar(OCH_2CH_2)_uOH$, in which u is preferably a number from 5 to 50, and more preferably a number from 10 to 30 and Ar denotes a tributylphenyl radical or a nonylphenyl radical. The alkyl phenols of the formula ArOH on which they are based are generally industrial products which usually contain various isomers in different quantitative ratios.

The preferred coupling auxiliaries according to the invention are fatty alcohol polyethylene glycol ethers.

The coupling auxiliaries according to the invention, which are surface-active substances, can also be characterised by their HLB value (hydrophlic lipophilic balance), a parameter which is normal for surfactants and which provides information on the ratio between water-solubility and oil-solubility (see, for example, Römpps Chemie-Lexikon, 8th Edition, Stuttgart 1983, page 1715). The HLB values of the fatty alcohol polyethylene glycol ethers, fatty acid polyethylene glycol esters and tributylphenyl and nonylphenyl polyethylene glycol ethers to be used are preferably from 8 to 18, and more preferably from 10 to 16.

The coupling auxiliaries according to the invention are preferably used in quantities of 0.1 to 10% by weight, and more preferably 0.5 to 3% by weight, based on the dye obtained during the coupling reaction (and calculated on the basis of dry substances).

The coupling reaction according to the invention for the production of the dye of the formula (I) in the γ modification is preferably carried out in the presence of HCl, and in particular in aqueous hydrochloric acid.

The pH value of the coupling reaction is preferably below 1.5, and in particular below 1.0. The strength by weight of the aqueous hydrochloric acid employed is preferably from 15 to 20%. More preferably the diazo component is diazotised in hydrochloric acid with the usual diazotising agents, such as sodium nitrite, and the resulting solution or a dispersion of the diazonium compound is then generally combined with a solution or dispersion of the coupling component, the coupling reaction being carried out in the presence of one or more of the abovementioned auxiliaries according to the invention. It is also possible for other customary auxiliaries to be present during the coupling reaction, such as for example additional dispersing agents, such as for example those based on lignosulphonates, or on condensation products of naphthalenesulphonic acids and formaldehyde.

The coupling reaction according to the invention for the preparation of the dye of the formula (I) in the β modification is carried out preferably in $H_2SO_4$. First of all the diazo component is diazotised in the customary manner, for example using nitrosylsulphuric. acid or an alkali metal nitrite, such as sodium nitrite, preferably in $H_2SO_4$, and in particular in 50–100 % strength, and more preferably in 75–95 % strength $H_2SO_4$, and the resulting solution or dispersion of the diazonium compound is then combined with a solution or dispersion of the coupling component, the coupling reaction being carried out in the presence of one or more of the abovementioned auxiliaries according to the invention, as well as $H_2SO_4$. Other customary auxiliaries can also be present during the coupling reaction, e.g. additional dispersing agents, such as for example those based on lignosulphonates or on condensation products of naphthalenesulphonic acids and formaldehyde.

Preferably the solution or dispersion of the diazonium salt is allowed to flow into the solution or dispersion of the coupling component, although the reverse procedure is also possible, in which the solution or dispersion of the coupling component is allowed to flow into the preferably hydrochloric acid or sulphuric acid solution or dispersion of the diazonium salt. In both methods of procedure the coupling auxiliary according to the invention is preferably added to the solution or dispersion of the coupling component before commencing the coupling reaction. It can however also be added to the solution or dispersion of the diazonium salt or to both the diazo and the coupling solution or dispersion before commencing the coupling reaction. It is however also possible for the coupling auxiliary to be added in portions or continuously during the coupling reaction. The coupling temperature is generally in the range from 0° to 35° C., and preferably from 0° to 20° C. When carrying out the coupling reaction it is usual to employ direct cooling, for example by adding ice, or indirect cooling.

The dye of the formula (I) which is converted into the β modification by heat treatment or by crystallisation or which is obtained directly in the β or γ modification during the coupling reaction is generally then converted into a dispersion, i.e. into a liquid dye preparation, by a milling process, or into a pulverulent dye preparation, if appropriate after drying. This milling process is for example carried out in mills such as ball mills, vibration mills, bead mills or sand mills or in kneaders. After milling the size of the dye particles is about 0.1 to 5 μm. The milling is generally carried out in the presence of dispersing agents such as for example condensation products of naphthalenesulphonic acid and formaldehyde or phenol, formaldehyde and sodium bisulphite, alkali metal salts of lignosulphonates or sulphite cellulose waste liquor or polyvinyl sulphonates, which coat the surface of the mechanically comminuted dye particles and thus prevent their recrystallisation and agglomeration. In addition to these dispersing agents, it can be advantageous also to add other auxiliaries to the dye during milling, such as for example wetting agents, antifreeze agents, fillers, dustproofing agents, hydrophilising agents or biocides.

Anionic and/or non-ionic dispersing agents are particularly suitable for use in the milling process. Anionic dispersing agents are preferred and a mixture of anionic and non-ionic dispersing agents is particularly preferred.

As far as anionic dispersing agents are concerned, condensation products of aromatic sulphonic acids and formaldehyde, such as condensation products of formaldehyde and alkylnaphthalenesulphonic acids or of formaldehyde, naphthalenesulphonic acids and benzenesulphonic acid, and condensation products of optionally substituted phenol with formaldehyde and sodium bisulphite have proven to be particularly effective.

In addition, lignosulphonates can above all be used, such as for example those obtained by the sulphite or Kraft process. Such lignosulphonates are preferably products which are partially hydrolysed, oxidised, propoxylated or desulphonated and fractionated by known methods, such as for example according to their molecular weight or degree of sulphonation. Mixtures of sulphite and Kraft lignosulphonates are also highly effective.

Particularly suitable lignosulphonates are those having an average molecular weight of between 1,000 and 100,000, a content of active lignosulphonate of 80% or more and preferably a low content of polyvalent cations. The degree of sulphonation can vary within wide limits.

Non-ionic dispersing agents or emulsifiers are for example reaction products of alkylene oxides with alkylatable compounds, such as for example fatty alcohols, fatty amines, fatty acids, phenols, alkyl phenols, arylalkyl phenols and carboxylic acid amides.

These products are for example ethylene oxide adducts from the class of the reaction products of ethylene oxide with a) saturated and/or unsaturated fatty alcohols containing 6 to 20 C atoms; or b) alkyl phenols containing 4 to 12 C atoms in the alkyl radical, or c) saturated and/or unsaturated fatty amines containing 14 to 20 C atoms;

d) saturated and/or unsaturated fatty acids containing 14 to 20 C atoms.

Specific ethylene oxide adducts which may be mentioned are:

a) reaction products of saturated and/or unsaturated fatty alcohols containing 6 to 20 C atoms, and 5 to 30 mols of ethylene oxide, b) reaction products of alkyl phenols containing 4 to 12 C atoms with 5 to 20 mols of ethylene oxide;

c) reaction products of saturated and/or unsaturated fatty amines containing 14 to 20 C atoms with 5 to 20 mols of ethylene oxide;

d) reaction products of saturated and/or unsaturated fatty acids containing 14 to 20 C atoms with 5 to 20 mols of ethylene oxide.

Preferred solid dye preparations contain 10 to 50% by weight of at least one dye corresponding to the formula (I) in the β or β modification, 10 to 80% by weight of lignosulphonate, 0 to 20% by weight of a condensation product of naphthalenesulphonic acid and formaldehyde, 0 to 10% by weight of a non-ionic surfactant, 0 to 1.5% by weight of a wetting agent, 0 to 1.0% by weight of a defoaming agent, up to 12% by weight of water (residual moisture), up to 1.5% by weight of a dustproofing agent, preferably based on a mineral oil, based on the dye preparation.

It is preferred to mill the individual components together in an aqueous suspension in a bead mill until the desired fine dispersion is obtained. The dustproofing agent can be added before, during or after the milling of the suspension. Spray-drying is then preferably carried out.

The drying process required for the production of dye powders can be carried out in commercially available spray driers.

In pulverulent or granular and in particular in liquid dye preparations, the β and γ modifications according to the invention of the dye of the formula (I) do not tend to agglomerate and they produce better wetting than the a-modification when preparing dyeing and padding liquors and printing pastes and they can be dispersed quickly and without any laborious manual or mechanical stirring. The liquors and printing pastes are homogeneous and can be processed without problems in modern dyehouses without clogging the nozzles of the metering machines.

The liquid preparations are not prone to phase separation and in particular are not prone to sedimentation or the formation of putty-like deposits. It is thus not necessary to carry out the likewise laborious homogenisation of the dye in the packaging drum before its removal.

The milling paste obtained during the preparation of the powder after the milling of the dye in the presence of the dispersing agent and auxiliary is stable even at elevated temperatures and over relatively long periods of time. The milling paste need not be cooled either in the mills or after issuing from the mills and can be stored in collecting tanks before spray-drying over prolonged periods of time. The thermal stability is also evidenced by the fact that the spray-drying can be carried out at high temperatures without any agglomeration of the material to be dried. Increasing the inlet temperature of the drier while maintaining the outlet temperature at the same level results in an increase in the drying capacity and accordingly a reduction in the manufacturing costs.

In contrast to the α modification, the β and γ modifications according to the invention of the dye of the formula (I) can be used without any restrictions for dyeing and printing textile materials made of polyester, such as polyethylene glycol terephthalate, and/or cellulose esters, such as cellulose acetates, or blended fabrics of these materials with wool or cellulose.

The superiority of the β and γ modifications compared with the α modification is also evident when dyeing from an aqueous dye bath under the conditions of modern practice. These conditions are characterised by high package densities in package and beam dyeings, short liquor ratios, i.e. high dye concentrations, as well as high shearing forces in the dyeing liquor caused by high pumping capacities. Even under these conditions the β and γ modifications are not prone to agglomeration and no deposits are formed on the textile materials to be dyed. Thus, homogeneous dyeings are obtained without any differences in colour intensity between the outer and the inner layers of the wound packages, and the dyeings do not display any rub-off. Finally, the use of the β and γ modifications according to the invention for pad-dyeings and prints likewise produces a homogeneous, speck-free appearance of the material concerned.

EXAMPLE 1 a) The dye of the formula (I) according to the prior art is prepared by the process described in EP-A 240 902, by initially stirring 173 g of 2-chloro-4-nitroaniline into 400 g of concentrated sulphuric acid in solution and carrying out diazotisation with 326 g of 40% strength by weight nitrosylsulphuric acid at 20 to 30° C. The resulting diazo solution is coupled at from 20 to 25° C. over a period of 2 hours onto a finely divided suspension of 250 g of N-(2-cyanoethyl)-N-(2-phenylethyl) aniline, 10 g of a lignosulphonate dispersing agent, 750 g of water and 20 g of butyl acetate with direct cooling with ice. After subsequent stirring for three hours the precipitated dye is isolated by filtration and washed with water until neutral. In the water-moist filter cake obtained, the dye is present in the α modification which has the X-ray diffraction diagram shown in FIG. 2.

b) 100 g of the dye produced according to 1a) are stirred into 500 ml of water in the presence of 0.5 g of a dispersing agent based on lignosulphonate in an autoclave for 2 hours at 125° C. The dye suspension is then cooled and filtered once again. The dye in the form of a water-moist filter cake is in the β modification, which has the X-ray diffraction diagram shown in FIG. 3.

c) 100 g of the dye produced according to 1a) are milled in a sand mill with 50 g a sodium lignosulphonate, 50 g of a condensation product of m-cresol, formaldehyde and sodium bisulphite, 40 g of a condensation product of m-cresol, phenol, nonylphenol, formaldehyde and sodium bisulphite and water, until 90% of the dye particles are equal to or smaller than 1 μm. The quantity of water added was calculated so that the dye content in the liquid preparation obtained after milling is 17%.

d) If the liquid preparation produced according to 1c) is introduced under a pressure of about 3 kp/m² through a nozzle of stainless steel with a diameter of 0.7 mm, accurate, repeated metering can be carried out. If, on the other hand, a liquid preparation is used of the kind prepared as described under 1c) from a dye which has not undergone the heat treatment of 1b) and is present in the α modification, the dye spatters on issuing from the nozzle during metering or the nozzle becomes completely clogged.

EXAMPLE 2 a) 100 g of the dye produced according to 1a) are heated under reflux with 80 g of a condensation product of m-cresol, phenol, nonylphenol, formaldehyde and sodium bisulphite in 400 ml of water at a pH value of 4.5 for 2 hours. Then 90 g of a sodium lignosulphonate are added and the batch was milled in a sand mill at pH 8 until the fine dispersion described in 1c) was obtained. The milled paste thus obtained is spray-dried in a spray drier at an inlet temperature of 155° C. and an outlet temperature of 850° C.

b) If the powder obtained according to 2a) is employed for producing a dye liquor in water, it already partially disperses while falling to the bottom of the vessel and completely disperses after brief stirring.

c) In contrast, a powder preparation which has been produced according to the instructions in 2a) but without the heat treatment described therein, and has thus been produced from the dye in the α modification, has to be stirred for a prolonged period with a special stirrer until a homogeneous dispersion is obtained, and possibly then has to be filtered in order to obtain speck-free dyeings.

d) If wound packages are dyed with the powder preparations produced according to 2a) the resulting dyeings are even and rub-fast, i.e. the colour intensities in the outer and inner layers of the wound package are identical and no dye deposits are formed.

EXAMPLE 3

172.5 g of 2-chloro-4-nitroaniline are diazotised in accordance with 1a) with 325 g of 40% strength by weight nitrosylsulphuric acid and the resulting diazo solution is coupled onto 250 g of N-(2-cyanoethyl)-N-(2-phenylethyl) aniline in the presence of 5 g of a fatty alcohol polyethylene glycol ether based on an unsaturated $C_{16}$–$C_{18}$ fatty alcohol and 3 g of a sodium lignosulphonate. The fatty alcohol polyethylene glycol ether contains about 20 $CH_2CH_2O$ units per mol of fatty alcohol and has a HLB value of 15. After filtration and washing with water, the filter cake obtained, in which the dye is in the B modification, which has the X-ray diffraction diagram shown in FIG. 3, is converted according to the instructions of Example 1c) into a liquid preparation which also meets all the technical requirements.

EXAMPLE 4

10 of the dye prepared according to the instructions of Example 1a), which has been subsequently dried to constant weight and is likewise in the α modification, are recrystallised from 100 ml of toluene. The recrystallised dye is in the β modification and can be converted into liquid, powder or granular preparations which also meet all the technical requirements.

EXAMPLE 5

The dye of the formula (I) in the γ modification is prepared by initially introducing 10 g of an arylphenyl polyglycol ether (reaction product of benzylphenyl phenol+ 14 ethylene oxide) and 500 g (2.9 mols) of 2-chloro-4-nitroaniline into 420 ml of water, adding water to make up to 1850 ml and converting the mixture into a fine mixture in a comminution process. 1000 ml of concentrated hydrochloric acid (35%) were added and the mixture was then cooled to below 0° C. Diazotisation was carried out using a sodium nitrite solution and the mixture was subsequently stirred for 2 hours with an excess of nitrite. A solution of the diazonium salt was obtained in a yield of >98% of theory, based on 2-chloro-4-nitroaniline. The hydrochloric acid diazonium salt solution was added at 20 to 25° C. within a period of 2 to 2 ½ hours to a finely milled suspension of 733 g (2.9 mols) of N-(2-cyanoethyl)-N-(2-phenylethyl)aniline, 2.4 g (0.02 mol) of amidosulphonic acid, 10 g of a Kraft lignosulphonate, 16 g of a fatty alcohol polyglycol ether (which is a reaction product of a $C_{16}$–$C_{18}$ alcohol and 20 mols of ethylene oxide) and 2000 ml of water.

After the mixture was filtered and the filter cake washed with water a water-moist press cake was obtained in which the dye was present in the γ modification. The corresponding X-ray diffraction diagram is shown in FIG. 1.

33.4 parts (100%) of the resulting dye were milled with
28.2 parts of lignosulphonate,
27.2 parts of a condensation product of naphthalenesulphonic acid and formaldehyde,
1.0 part of a non-ionic surfactant,
1.0 part of a wetting agent and
0.2 parts of a defoaming agent, in a bead mill until the required fine dispersion was obtained.
Then 1.0 part of a dustproofing agent (based on mineral oils) was added to the suspension and the water was removed by spray-drying. (Residual moisture=8%)

Use example 1

2 g of the solid granulated dye preparation obtained according to Example 5 were dispersed in 1,000 g of water. 0.5 to 2 g/l of a commercially available dispersing agent based on a condensation product of the sodium salt of naphthalenesulphonic acid and formaldehyde, 0.5 to 2 g/l of monosodium phosphate and 2 g of a commercially available levelling agent (of the oleic acid/nonylphenol type, which has been reacted with ethylene oxide) were added to the dispersion, and a pH value of 4.5 to 5.5 was then adjusted using acetic acid. 100 g of a textured polyester fabric based on polyethylene glycol terephthalate was introduced into the resulting dyeing liquor and dyeing was carried out for 60 minutes at 130° C.

The resulting dyeing is even and rub-fast and the inner and outer layers of the wound package are uniformly dyed; no deposits of dye can be found on the substrate.

Comparison example 1

The same procedure is followed as in Use example 1, except that the dye of the unstable α modification according to the above Example 1 is used instead of the dye of the γ modification according to Example 5.

Even during the heating-up stage of the dyeing liquor the dispersion stability of the dye in the α modification in the dyeing liquor was partially destroyed, as a result of which precipitation occurred as well as an increase in the pressure in the dyeing apparatus. There was considerable rub-off on the dyed textile material (there were deposits of the dye on the surface of the fibre as well as considerable differences in the colour intensity between the outer and inner layers of the wound package: so-called AMI (outside-middle-inside) effects.

We claim:
1. Dye of the formula (I) in the β or γ modification

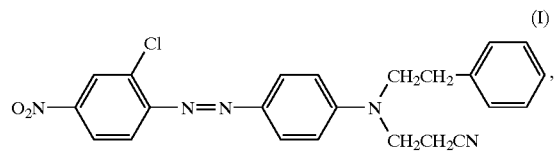

which has lines at the following angles of diffraction 2 θ (°) in the X-ray diffraction diagram (Cu $K_\alpha$ mradiation):
β modification
high-intensity lines:
4.9; 13.95; 17.15; 19.5; 21.85; 25.2; 26.05; 28.75;
medium-intensity lines:
16.0; 24.3; 27.3; 30.0; 31.15.
γ modification
high-intensity lines:
11.57; 14.90; 17.14; 20.64; 24.35; 25.05; 26.37;
medium-intensity lines:
10.26; 13.71; 16.81; 18.71; 20.94; 22.07; 23.84; 28.81; 29.69.

2. Process for preparing the β modification of the dye of the formula (I) according to claim 1, characterized in that the dye which is in the α modification is heated in an aqueous phase to temperatures of 70 to 150° C. for a time sufficient to form the β modification and isolated from the aqueous suspension by filtration.

3. Process according to claim 2, characterised in that the heating is carried out in the presence of one or more surface-active substances.

4. Process according to claim 2, characterised in that the heating is carried out in the presence of one or more organic solvents.

5. Process for preparing the β modification of the dye of the formula (I) according to claim 1, characterised in that the dye which is in the α modification is recrystallised from a solvent or solvent mixture.

6. Process for preparing the β modification of the dye of the formula (I) according to claim 1 by coupling diazotised 2-chloro-4-nitroaniline onto N-(2-cyanoethyl)-N-(2-phenylethyl)aniline, wherein the coupling reaction is carried out in the presence of one or more auxiliaries selected from the group consisting of
  a) the tertiary phosphoric acid esters of fatty alcohols,
  b) tertiary phosphoric acid esters of fatty alcohol polyethylene glycol ethers;
  c) tertiary phosphoric acid esters of polyethylene glycols;
  d) the fatty alcohol polyethylene glycol ethers;
  e) the fatty acid polyethylene glycol esters;
  f) the tributylphenyl polyethylene glycol ethers; and
  g) the nonylphenyl polyethylene glycol ethers and in the absence of both an ester of an optionally substituted lower aliphatic carboxylic acid and an optionally substituted aliphatic alcohol.

7. Process according to claim 6, characterised in that the coupling reaction is carried out in the presence of one or more fatty alcohol polyethylene glycol ethers.

8. Process according to claim 6 for the preparation of the β modification, characterised in that the coupling reaction is carried out in the presence of sulphuric acid.

9. Process according to claim 6 for the preparation of the γ modification, characterised in that the coupling reaction is carried out in the presence of HCI.

10. A process for dyeing and printing textile materials of polyester and/or cellulose esters for blended fabrics of these materials and wool or cellulose which comprises contacting the γ modification of the dye of formula (I) according to claim 1 with said material.

11. The dye of formula I as claimed in claim 1, wherein the dye is in the β-modification.

12. Solid dye preparations containing 10 to 50% by weight of at least one dye corresponding to the formula (I) in the β or γ modification according to claim 1, 10 to 80% by weight of lignosulphonate, 0 to 20% by weight of a condensation product of naphthalene-sulphonic acid and formaldehyde, 0 to 10% by weight of a non-ionic surfactant, 0 to 1.5% by weight of a wetting agent, 0 to 1.0% by weight of a defoaming agent, up to 12% by weight of water (residual moisture) and up to 1.5% by weight of a dustproofing agent, based on the dye preparation.

13. A process for preparing the γ modification of the dye of the formula (I) according to claim 1 which comprises coupling diazotised 2-chloro4-nitroaniline onto N-(2-cyanoethyl)-N-(2-phenylethyl)aniline, wherein the coupling reaction is carried out in the presence of one or more auxiliaries selected from the group consisting of a) the tertiary phosphoric acid esters of fatty alcohols;

b) tertiary phosphoric acid esters of fatty alcohol polyethylene glycol ethers;

c) tertiary phosphoric acid esters of polyethylene glycols;

d) the fatty alcohol polyethylene glycol ethers;

e) the fatty acid polyethylene glycol esters;

f) the tributylphenyl polyethylene glycol ethers; and g) the nonylphenyl polyethylene glycol ethers and in the absence of both an ester of an optionally substituted lower aliphatic carboxylic acid and an optionally substituted aliphatic alcohol.

14. The dye of formula I as claimed in claim 1, wherein the dye is in the γ modification.

15. A process for preparing the β modification of the dye of the formula (1) according to claim 1, which comprises heating the dye in the α modification form in an aqueous phase to temperatures of 90 to 130° C. in an aqueous suspension for a time sufficient to form the β modification and isolating said modified dye from the aqueous suspension by filtration.

16. The process as claimed in claim 15, wherein the reaction is carried out from 2 to 5 hours.

17. A process for dyeing and printing textile materials of polyester and/or cellulose esters for blended fabrics of these materials and wool or cellulose which comprises contacting the β or modification of the dye of formula (I) according to claim 1 with said material.

18. A process for dyeing textile materials of polyester and/or cellulose esters or blended fabrics of these materials and wool or cellulose by adding the β-modification of the dye of the formula I and said materials to a dye bath.

* * * * *